United States Patent [19]  
Anderson

[11] 4,324,777  
[45] * Apr. 13, 1982

[54] MATERIAL AND METHOD TO DISSOCIATE WATER AT CONTROLLED RATES

[76] Inventor: Eugene R. Anderson, 601 Highland, Wills Point, Tex. 75169

[*] Notice: The portion of the term of this patent subsequent to Jan. 8, 1997, has been disclaimed.

[21] Appl. No.: 85,374

[22] Filed: Oct. 16, 1979

Related U.S. Application Data

[63] Continuation-in-part of Ser. No. 68,749, Aug. 23, 1979, and a continuation-in-part of Ser. No. 902,705, May 4, 1978, Pat. No. 4,207,095, and a continuation-in-part of Ser. No. 902,708, May 4, 1978, Pat. No. 4,182,748.

[51] Int. Cl.$^3$ .................... C01B 1/07; C01B 13/02
[52] U.S. Cl. .................... 423/579; 75/134 N; 423/657
[58] Field of Search ............. 423/579, 657, 648 R; 75/134 N, 134 A, 134 F, 138, 169

[56] References Cited

U.S. PATENT DOCUMENTS

| | | | |
|---|---|---|---|
| 2,083,648 | 6/1937 | Gorke | 423/641 X |
| 2,837,408 | 6/1958 | Sakowski | 423/657 X |
| 3,313,598 | 4/1967 | Glukstein | 423/657 X |
| 3,490,871 | 1/1970 | Miller et al. | 423/657 X |
| 3,540,854 | 11/1970 | Brooke et al. | 423/657 X |
| 3,833,357 | 9/1974 | Bianchi et al. | 423/657 |
| 3,985,866 | 10/1976 | Oda et al. | 423/657 |
| 4,182,748 | 1/1980 | Anderson | 423/579 |

FOREIGN PATENT DOCUMENTS

| | | | |
|---|---|---|---|
| 337722 | 2/1904 | France | 423/657 |
| 3188 | of 1909 | United Kingdom | 423/657 |

*Primary Examiner*—Edward J. Meros

[57] ABSTRACT

A material and method for the decomposition/dissociation of water into hydrogen and oxygen is disclosed. The material comprises an amalgam of an alkali metal, mercury, and aluminum combined with a catalytically effective amount of an alloy comprising platinum and at least one metal selected from the group consisting of germanium, antimony, gallium, thallium, indium, cadmium, bismuth, lead, zinc and tin, and with an extender metal to control the rate of dissociation of the water while being non-reactive with the amalgam during dissociation.

29 Claims, No Drawings

MATERIAL AND METHOD TO DISSOCIATE WATER AT CONTROLLED RATES

CROSS-REFERENCE TO RELATED APPLICATIONS

This application is a continuation-in-part of application Ser. No. 902,705, entitled MATERIAL AND METHOD FOR OBTAINING HYDROGEN BY DISSOCIATION OF WATER, filed on May 4, 1978, now U.S. Pat. No. 4,207,095; of application Ser. No. 902,708, entitled MATERIAL AND METHOD FOR OBTAINING HYDROGEN AND OXYGEN BY DISSOCIATION OF WATER, filed on May 4, 1978, now U.S. Pat. No. 4,182,748; and of application Ser. No. 068,749, entitled MATERIAL AND METHOD FOR OBTAINING HYDROGEN BY DISSOCIATION OF WATER, filed on Aug. 23, 1979; and is related to application Ser. No. 85,373 entitled HYDROGEN GENERATING APPARATUS AND METHOD, filed Oct. 16, 1979; and to application Ser. No. 56,994, entitled FUEL SYSTEM AND METHOD, filed on July 12, 1979.

BACKGROUND OF THE INVENTION

This invention relates to a material for and method of effecting the decomposition/dissociation of water into hydrogen and oxygen.

The water is reacted with an amalgam of sodium, aluminum and mercury to form hydrogen and a metallic hydroxide denoted by the formula $Na_3AL(OH)_6$. The $Na_3AL(OH)_6$ is unstable at the temperature of formation in the presence of a catalyst comprising platinum and at least one element selected from the group consisting of germanium, antimony, gallium, thallium, indium, cadmium, bismuth, lead, zinc and tin and breaks down to form metallic sodium and aluminum thereby releasing oxygen and hydrogen.

DESCRIPTION OF THE PRIOR ART

It is well known in the prior art that the alkali metals react with water to form hydrogen and the stable alkali metal hydroxide. The foregoing reaction is rapid, the heat generated intense and explosion of hydrogen ordinarily occurs. The result is an unsatisfactory and dangerous method of generating hydrogen. It is also well known that alkali metal peroxides may be used for the generation of oxygen (see U.S. Pat. No. 3,574,561).

Thermochemical cycles comprising metal-metaloid combinations for the generation of both hydrogen and oxygen are disclosed in U.S. Pat. No. 3,969,495. Closed cycle processes for dissociation of water into hydrogen and oxygen are disclosed in U.S. Pat. Nos. 3,821,358, 3,928,549 and 4,011,305. Combinations of various metals in multistep processes for dissociation of water are, therefore, well known; however, the simple and facile manner of producing hydrogen and oxygen utilizing an amalgam of alkali metal, aluminum and mercury combined with a catalytic alloy comprising platinum and at least one element selected from the group consisting of germanium, antimony, gallium, thallium, indium, cadmium, bismuth, lead, zinc and tin has not been appreciated.

DESCRIPTION OF THE INVENTION

The material I have found to be suitable for the generation of hydrogen and oxygen from water without spontaneous combustion of the resultant evolved hydrogen and oxygen gases comprises an amalgam of (1) an alkali metal such as lithium, sodium, potassium, cesium, or combinations thereof, (2) aluminum and (3) mercury combined with a catalytic alloy comprising platinum and at least one element selected from the group consisting of germanium, antimony, gallium, thallium, indium, cadmium, bismuth, lead, zinc and tin and with a metal to control the rate of dissociation of the water while being non-reactive with the amalgam during dissociation.

The particle size of the sodium and aluminum is such as to enable formation of an amalgam and may fall within the range of from about 10 to about 100 mesh. Most preferably, the particle size of the aluminum should be about 10 mesh. Alkali metal of $\frac{1}{4}''$ diameter is suitable. The particle size of either the alkali metal or aluminum is not critical since the foregoing metals and mercury readily intermix. The smaller the particle size, of course, the more rapid the mixing.

The atomic weight ratio of alkali metal to mercury is from about 1:100 to about 100:1 and the atomic weight ratio of alkali metal to aluminum is from about 1:100 to about 100:1. Preferably the atomic weight ratio of alkali metal to mercury is from about 3:1 to about 1:1.5 and the atomic weight ratio of alkali metal to aluminum is from about 1:1 to about 3:1.

The amalgam of alkali metal, aluminum and mercury is combined with a catalytically active alloy which is present in a catalytically effective amount and, at the conditions of hydrogen generation, functions to regenerate amalgam to the active metallic state.

It is essential that the catalyst/alloy contain a platinum group metal and specifically platinum. The catalyst/alloy is generally comprised of platinum and at least one element selected from the group consisting of germanium, antimony, gallium, thallium, indium, cadmium, bismuth, lead, zinc and tin.

Preferably the catalyst comprises platinum and at least one element selected from the group consisting of germanium, antimony, gallium, thallium, indium and cadmium.

Catalytic activity is further enhanced by the addition of minor amounts of zirconium and chromium.

Lead and/or gold may be incorporated in the catalyst as an alloying element to lower the melting point of the alloy.

The alloy and amalgam may be combined in weight ratios of from about 1:1 to about 1:5 and preferably from about 1:2 to about 1:3.

Properties of the material which are desirable to control are its (i) hardness, (ii) the temperature of the dissociation reaction, and (iii) the rate of dissociation. These properties are regulated by choosing an extender metal that does not react with the amalgam at the point of dissociation in an amount effective to control the rate of the dissociation and/or temperature of the reaction and combining this extender metal with the amalgam and catalytic alloy. Metals that have been found which accomplish this result are silver, copper, thallium, titanium, magnesium, molybdenum, tungsten, cadmium, nickel, rhodium, iron, palladium, cobalt, chromium, tin, iridium, lead, gallium, vanadium, gold, antimony, zirconium and bismuth. The most preferred extender metal used with the preferred amalgam and preferred catalytic alloy is copper. Further, these extender metals are effective in controlling the rate of dissociation and/or the temperature of the dissociation reaction in amounts of from about 0.1 wt. % to about 97.3 wt. % of the total combination of amalgam, catalytic alloy and extender metal.

Although not wishing to be bound by these conclusions, it is believed that the extender metal controls these properties by coating the amalgam and catalytic alloy to thereby regulate the surface area of the amalgam exposed to water contact which thereby controls the properties of the material and by varying the heat conductance property of the extender metal, the heat transferred from the dissociation reaction thereby controls the properties of the material.

Further, although not wishing to be bound by the following explanation, it is believed that the water reacts with the alkali metal, e.g., sodium, and the aluminum liberating hydrogen and forming $Na_3AL(OH)_6$. The $Na_3AL(OH)_6$ is unstable, and in the presence of the alloy at the conditions of $Na_3AL(OH)_6$ formation, the foregoing composition decomposes to form $H_2$, $O_2$ and regenerated amalgam. The alloy apparently functions to catalyze the decomposition, and thereby extends the useful life of the amalgam. The process may be depicted as follows:

$$2\ Na + 2\ H_2O \longrightarrow 2\ NaOH + H_2$$

$$6\ H_2O + 2\ AL + 6\ NaOH \longrightarrow 2\ Na_3AL(OH)_6 + 3\ H_2$$

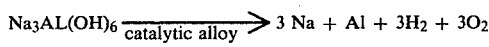

$$Na_3AL(OH)_6 \xrightarrow{catalytic\ alloy} 3\ Na + Al + 3H_2 + 3O_2$$

The preferred catalytic alloy comprises (1) platinum present in an amount of from about 0.7 to about 1.1% by weight, (2) lead present in an amount of from about 42.9 to about 71.5% by weight, (3) antimony present in an amount of from about 25.5 to about 42.5% by weight, (4) chromium present in an amount of from about 0.7 to about 1.1% by weight, (5) zirconium present in an amount of from about 4.1 to about 6.8% by weight and gold present in an amount of from about 1.1 to about 1.9% by weight.

A specific example of the alloy comprises about 0.9 wt. % platinum, about 57.3 wt. % lead, about 34.0 wt. % antimony, about 0.9 wt. % chromium, about 5.4 wt. % zirconium and about 1.5 wt. % gold.

The amalgam of sodium, aluminum and mercury is prepared utilizing any of the well known procedures with the added proviso that an inert atmosphere be employed. Amalgamation may be facilitated by utilization of an elevated temperature, preferably around 200° C.±10° C. The amalgam is preferably maintained at this elevated temperature for about 10 minutes where 100 grams are being processed, and the time is extended about 1 minute for each additional 100 gram aliquot.

The resulting amalgam is cooled, generally to room temperature, utilizing an inert atmosphere. For this purpose either helium or nitrogen are satisfactory. Cooling is preferably effected in a desiccator to insure that no water contacts the amalgam.

As in the preparation of the amalgam and all other steps in the method of manufacture of the various compositions of this invention, precaution must be taken during preparation to avoid the presence of oxygen because it has been observed that oxygen operates to poison the resultant material.

The preparation of the catalytic alloy selected may be in any well known manner having in mind the proviso that an inert atmosphere be maintained.

The catalytic alloy, upon solidification, and as a practical matter, upon cooling is ground into a powder, preferably a fine powder of about 10 mesh or less. Cooling may be effected in a dessicator to insure the absence of oxygen and moisture, whose presence is deterimental during preparation. Grinding/pulverizing may be effected in any well known manner including use of a ball, hammer and/or stamp mill.

The extender metal is utilized in a particulate form of comparable size to the other components, which size is generally from about 10 to about 100 mesh and may be obtained by any conventional process.

The amalgam, catalytic alloy and extender metals are used in an alloy form, which means the particles of amalgam, catalytic alloy and extender metal are combined to form an admixture and alloyed under inert conditions at a temperature above the melting point of said admixture.

EXAMPLE I

Preparation of Amalgam

An amalgam comprising 35.144 parts of weight of sodium, 13.749 parts by weight of aluminum and 51.107 parts by weight of mercury is formed in a graphite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 19.0 parts by weight lead, 11.3 parts by weight antimony, 0.3 parts by weight platinum, 0.5 parts by weight gold, 1.8 parts by weight zirconium and 0.3 parts by weight chromium are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Reactor Block Comprising Amalgam, Catalytic Alloy and Extender Metal The amalgam, catalytic alloy and an extender metal of powdered copper of about 10 mesh are admixed in the following proportions:
21.775 parts by weight amalgam.
5.625 parts by weight alloy.
72.6 parts by weight extender metal.

The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of the finished product. The compressed mass in a crucible conforming to the shape thereof is heated to an elevated temperature of about 10° C. above the melting point of the mass and this temperature is maintained for about 10±1 minutes. In the oven utilized for heating, an inert atmosphere is maintained. Thereafter the crucible and its contents are transferred to a desiccator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor block is contacted with a fine spray of water at about room temperature in an atmospheric environment with a reaction temperature of about 134.0° C. (273.2° F.). The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.14 gallons of water per minute.

EXAMPLE II

Preparation of Amalgam

An amalgam comprising 37.688 parts by weight of aluminum, 32.112 parts by weight sodium and 30.2 parts by weight mercury is formed in a graphite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 60.7 parts by weight lead, 0.8 parts by weight platinum and 38.5 parts by weight germanium are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Reactor Block Comprising Amalgam, Catalytic Alloy and Extender Metal The amalgam, catalytic alloy and an extender metal of powdered copper of about 10 mesh are admixed in the following proportions:
21.775 parts by weight amalgam.
5.625 parts by weight alloy.
72.6 parts by weight extender metal.

The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of the finished product.

The compressed mass in a crucible conforming to the shape thereof is heated to an elevated temperature of about 10° C. above the melting point of the mass and this temperature is maintained for about 10±1 minutes. In the oven utilized for heating, the inert atmosphere is maintained. Thereafter the crucible and its contents are transferred to a dessicator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment with a reaction temperature of about 119.3° C. (246.7° F.). The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.20 gallons of water per minute.

EXAMPLE III

Preparation of Amalgam

An amalgam comprising 22.947 parts by weight of aluminum, 18.391 parts by weight sodium and 58.662 parts by weight mercury is formed in a graphite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 63.064 parts by weight lead, 0.45 parts by weight platinum, 36.036 parts by weight antimony and 0.45 parts by weight germanium are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Reactor Block Comprising Amalgam, Catalytic Alloy and Extender Metal The amalgam, catalytic alloy and a powdered extender metal comprising 50 wt. % tin and 50 wt. % bismuth of about 10 mesh are admixed in the following proportions:
21.775 parts by weight amalgam.

5.625 parts by weight alloy.
72.6 parts by weight extender metal.

The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of the finished product.

The compressed mass in a crucible conforming to the shape thereof is heated to an elevated temperature of about 10° C. above the melting point of the mass and this temperature is maintained for about 10±1 minutes. In the oven utilized for heating, an inert atmosphere is maintained. Thereafter the crucible and its contents are transferred to a dessicator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment with a dissociation reaction temperature of about 442.7° C. (728.9° F.). The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.12 gallons of water per minute.

EXAMPLE IV

Preparation of Amalgam

An amalgam comprising 19.383 parts by weight aluminum, 31.068 parts by weight potassium and 49.549 parts by weight mercury is formed in a graphite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 42.847 parts by weight lead, 2.429 parts by weight platinum, 42.847 parts by weight antimony, 2.429 parts by weight cadmium and 9.448 parts by weight zirconium are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Reactor Block Comprising Amalgam, Catalytic Alloy and Extender Metal The amalgam, catalytic alloy and an extender metal of powdered gallium of about 10 mesh are admixed in the following proportions:
21.775 parts by weight amalgam.
5.625 parts by weight alloy.
72.6 parts by weight extender metal.

The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of a finished product.

The compressed mass in a crucible conforming to the shape thereof is heated to an evaluated temperature of about 10° C. above the melting point of the mass and this temperature is maintained for about 10±1 minutes. In the oven utilized for heating, an inert atmosphere is maintained. Thereafter, the crucible and its contents are transferred to a dessicator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment with a dissociation reaction temperature of about 447.3° C. (837.1° F.). The gaseous effluent from said contact comprises hydrogen and oxygen and burns when subjected to electrical sparking. The volume of gas evolved is dependent on reactor block surface area and the volume of water impinging thereon. Generally, a 2.5 square cm surface will react with 0.14 gallons of water per minute.

EXAMPLE V

Preparation of Amalgam

An amalgam comprising 37.688 parts by weight aluminum, 32.112 parts by weight cesium and 30.2 parts by weight mercury is formed in a graphite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 60.7 parts by weight lead, 0.8 parts by weight platinum and 38.5 parts by weight germanium are introduced into a graphite crucible which is thereafter placed in an oven and heated to melting in an inert atmosphere of helium to form an alloy of said metals.

The resulting alloy is cooled in a dessicator to about room temperature in an inert helium atmosphere.

Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Reactor Block Comprising Amalgam, Catalytic Alloy and Extender Metal The amalgam, catalytic alloy and an extender metal of powdered copper of about 10 mesh are admixed in the following proportions:

21.775 by weight amalgam.
5.625 parts by weight alloy.
72.6 parts by weight metal.

The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of the finished product.

The compressed mass in a crucible conforming to the shape thereof is heated to an elevated temperature of about 10° C. above the melting point of the mass and this temperature is maintained for about 10±1 minutes. In the oven utilized for heating, an inert atmosphere is maintained. Thereafter the crucible and its contents are transferred to a dessicator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment with a dissociation reaction temperature of about 118° C. (244.4° F.). The gaseous effluent from said contact comprises hydrogen and oxygen and burns when subjected to electrical sparking. The volume of gas evolved is dependent on reactor block surface area and the volunme of water impinging thereon. Generally a 2.5 square cm surface will react with 0.20 gallons of water per minute.

EXAMPLE VI

Amalgam

The identification of the ingredients, the amounts of each ingredient and the method of preparing the amalgam are identical to the amalgam described in EXAMPLE I.

The identification of the ingredients, the amounts of each ingredient and the method of preparing the catalytic alloy are identical to the catalytic alloy described in EXAMPLE I.

Formation of Reactor Block Comprising Amalgam, Catalytic Alloy and Extender Metal The amalgam, catalytic alloy and an extender metal of powdered copper of about 10 mesh are admixed in the following proportions:

75.00 parts by weight amalgam.
24.900 parts by weight catalytic alloy.
0.100 parts by weight extender metal.

The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of the finished product. The compressed mass is disposed in a crucible and heated to an elevated temperature of about 10° C. above the melting point of the mass and this temperature is maintained for about 10±1 minutes. In the oven utilized for heating, an inert atmosphere is maintained. Thereafter the crucible and its contents are transferred to a dessicator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic compounds and/or hydroxide formation will "poison" the resultant reactor block and reduce the activity thereof. Moreover, during the steps of the process operated at elevated temperature, the presence of any oxygen will cause the mass to ignite.

The reactor block is contacted with a fine spray of water at about room temperature in an atmospheric environment with the dissociation reaction temperature being about 413.9° C. (747.02° F.). The gaseous effluent from said contact comprises hydrogen and oxygen and burns when subjected to electrical sparking. The volume of gas evolved is dependent upon the reactor block's surface area and the volume of water impinging thereon. Generally, a 2.5 square cm surface will react with 0.21 gallons of water per minute.

EXAMPLE VII

Amalgam

The identification of the ingredients, the amount of each ingredient and the method of preparing the amalgam are identical to the amalgam described in EXAMPLE I.

Catalytic Alloy 96.000 parts by weight antimony and 4.000 parts by weight platinum are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Reactor Block Comprising Amalgam, Catalytic Alloy and Extender Metal The amalgam, catalytic alloy and an extender metal of powdered magnesium of about 10 mesh are admixed in the following proportions:

50.0 parts by weight amalgam.
25.0 parts by weight catalytic alloy.
25.0 parts by weight extender metal.

The weighing and blending of the foregoing metallic compound should be done in an inert atmosphere.

After blending to provide a uniform mixture, the resultant mixture is compressed to form a solid mass by application of pressure of about 40,000 pounds per square inch in a graphite mold conforming to the desired shape of the finished product. The compressed mass is disposed within a crucible conforming to the shape of such mass and is heated to an elevated temperature of about 10° C. above the melting point of the mass and this temperature is maintained for about 10±1 minutes. In the oven utilized for heating, an inert atmosphere is maintained. Thereafter the crucible and its contents are transferred to a dessicator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resultant reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment with a dissociation reaction temperature of about 395.0° C. (743.0° F.). The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.34 gallons of water per minute.

EXAMPLE VIII

Amalgam

The identification of the ingredients, the amount of each ingredient and the method of preparing the amalgam are identical to the amalgam described in EXAMPLE I.

Catalytic Alloy

The identification of the ingredients, the amount of each ingredient and the method of preparing the catalytic alloy are identical to the catalytic alloy described in EXAMPLE I.

Formation of Reactor Block Comprising Amalgam, Catalytic Alloy and Extender Metal The amalgam, catalytic alloy and an extender metal of powdered bismuth of about 10 mesh are admixed in the following proportions:
21.775 parts by weight amalgam.
5.625 parts by weight catalytic alloy.
72.6 parts by weight extender metal.

The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of the finished product. The compressed mass is disposed in a crucible conforming to the shape of such mass and heated to an elevated temperature of about 10° C. above the melting point of the mass and this temperature is maintained for about 10±1 minutes. In the oven utilized for heating, an inert atmosphere is maintained. Thereafter the crucible and its contents are transferred to a dessicator wherein an inert atmosphere is maintained. Upon cooling, the resultant block is ready for use.

The entire foregoing procedure should be carried out under an inert atmosphere such as helium and nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor block is contacted with a fine spray of water at about room temperature in an atmospheric environment with a dissociation reaction temperature of about 468.4° C. (875.1° F.). The gaseous effluent from said contact comprises hydrogen and oxygen and burns when subjected to electrical sparking. The volume of gas evolved is dependent on reactor block surface area and the volume of water impinging thereon. Generally, a 2.5 square cm surface will react with 0.94 gallons of water per minute.

EXAMPLE IX

Amalgam

The identificaton of the ingredients, the amount of each ingredient and the method of preparing the amalgam are identical to the amalgam described in EXAMPLE II.

Catalytic Alloy

The identification of the ingredients, the amount of each ingredient and the method of preparing the catalytic alloy are identical to the catalytic alloy described in EXAMPLE II.

Formation of Reactor Block Comprising Amalgam, Catalytic Alloy and Extender Metal The amalgam, catalytic alloy and an extender metal of powdered bismuth of about 10 mesh are admixed in the following proportions:
21.775 parts by weight amalgam.
5.625 parts by weight catalytic alloy.
72.6 parts by weight extender metal.

The weighing and blending of the foregoing metallic components should be done in an inert atmosphere.

After blending to provide a uniform mixture, the resultant mixture is compressed to form a solid mass by application of pressure of about 40,000 pounds per square inch in a graphite mold conforming to the desired shape of the finished product. The compressed mass is disposed in a crucible conforming to its shape and is heated to an elevated temperature of about 10° C. above the melting point of the mass and this temperature is maintained for about 10±1 minutes. In the oven utilized for heating, an inert atmosphere is maintained. Thereafter, the crucible and its contents are transferred to a dessicator wherein an inert atmosphere is maintained. Upon cooling, the resultant block is ready for use.

The entire foregoing procedure should be carried out under an inert atmosphere such as helium or nitrogen and in the absence of contaminants. Oxidation of the metallic components and/or hydroxide formation will "poison" the resultant reactor block and reduce the activity thereof. Moreover, during the steps of the process operated at elevated temperature, the presence of any oxygen will cause the mass to ignite.

The reactor block is contacted with a fine spray of water at about room temperature in an atmospheric environment with a dissociation reaction temperature of about 453.7° C. (848.7° F.). The gaseous effluent from said contact comprises hydrogen and oxygen and burns when subjected to electrical sparking. The volume of gas evolved is dependent on reactor block surface area and the volume of water impinging thereon. Generally, a 2.5 square cm surface will react with 0.44 gallons of water per minute.

EXAMPLE X

Amalgam

The identification of the ingredients, the amount of each ingredient and the method of peparing the amalgam are identical to the amalgam described in EXAMPLE II.

Catalytic Alloy

The identification of the ingredients, the amount of each ingredient and the method of preparing the catalytic alloy are identical to the catalytic alloy described in EXAMPLE II.

Formation of Reactor Block Comprising Amalgam, Catalytic Alloy and Extender Metal The amalgam, catalytic alloy and an extender metal of powdered magnesium of about 10 mesh are admixed in the following proportions:
21.775 parts by weight amalgam.
28.225 parts by weight catalytic alloy.
50.0 parts by weight extender metal.

The weighing and blending of the foregoing metallic compounds should be done in an inert atmosphere.

After blending to provide a uniform mixture, the resultant admixture is compressed to form a solid mass by application of pressure of about 40,000 pounds per square inch in a graphite mold conforming to the desired shape of the finished product. The compressed mass is disposed in a crucible conforming to the shape of the mass and is heated to an elevated temperature of about 10° C. above the melting point of the mass and this temperature is maintained for about 10±1 minutes. In the oven utilized for heating, an inert atmosphere is maintained. Thereafter, the crucible and its contents are transferred to a dessicator wherein an inert atmosphere is maintained. Upon cooling, the resultant block is ready for use.

The entire foregoing procedure should be carried out under an inert atmosphere such as helium or nitrogen and in the absence of contaminants. Oxidation of the metallic components and/or hydroxide formation will "poison" the resultant reactor block and reduce the activity thereof. Moreover, during the steps of the process operated at elevated temperature, the presence of any oxygen will cause the mass to ignite.

The reactor blocks are contacted with a fine spray of water at about room temperature in an atmosperic environment with a dissociation reaction temperature of about 364.1° C. (687.38° F.). The gaseous effluent from said contact comprises hydrogen and oxygen and burns when subjected to electrical sparking. The volume of gas evolved is dependent on reactor block surface area and the volume of water impinging thereon. Generally, a 2.5 square cm surface will react with 0.54 gallons of water per minute.

EXAMPLE XI

Amalgam

The identificaton of the ingredients, the amount of each ingredient and the method of preparing the amalgam are identical to the amalgam described in EXAMPLE I.

Catalytic Alloy

The identification of the ingredients, the amount of each ingredient and the method of preparing the catalytic alloy are identical to the catalytic alloy described in EXAMPLE I.

Formation of Reactor Block Comprising Amalgam, Catalytic Alloy and Extender Metal The amalgam, catalytic alloy and an extender metal of powdered bismuth of about 10 mesh are admixed in the following proportions:
2.0 parts by weight amalgam.
0.664 parts by weight catalytic alloy.
97.336 parts by weight extender metal.

The weighing and blending of the foregoing metallic components should be done in an inert atmosphere.

After blending to provide a uniform mixture, the resultant mixture is compressed to form a solid mass by application of pressure of about 40,000 pounds per square inch in a graphite mold conforming to the desired shape of the finished product. The compressed mass is disposed in a crucible conforming to its shape and is heated to an elevated temperature of about 10° C. above the melting point of the mass and this temperature is maintained for about 10±1 minutes. In the oven utilized for heating, an inert atmosphere is maintained. Thereafter, the crucible and its contents are transferred to a dessicator wherein an inert atmosphere is maintained. Upon cooling, the resultant block is ready for use.

The entire foregoing procedure should be carried out under an inert atmosphere such as helium or nitrogen and in the absence of contaminants. Oxidation of the metallic componentsand/or hydroxide formation will "poison" the resultant reactor block and reduce the activity thereof. Moreover, during the steps of the process operated at elevated temperature, the presence of any oxygen will cause the mass to ignite.

The reactor block is contacted with a fine spray of water at about room temperature in an atmospheric environment with a dissociation reaction temperature of about 39.5° C. (103.1° F.). The gaseous effluent from said contact comprises hydrogen and oxygen and burns when subjected to electrical sparking. The volume of gas evolved is dependent on reactor block surface area and the volume of water impinging thereon. Generally, a 2.5 square cm surface will react with 0.01 gallons of water per minute.

EXAMPLE XII

Amalgam

The identification of the ingredients, the amount of each ingredient and the method of preparing the amalgam are identical to the amalgam described in EXAMPLE II.

Catalytic Alloy 6.900 parts by weight platinum and 93.100 parts by weight bismuth are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter, the amalgam is formed into a fine powder of about 10 mesh or less utilizing a ball mill. Grinding is effected in an inert atmosphere of helium.

The inert atmosphere is used to prevent oxidation of the alloy.

Formation of Reactor Block Comprising Amalgam, Catalytic Alloy and Extender Metal The amalgam, catalytic alloy and an extender metal, which will be identified in Table A, of about 10 mesh are admixed in the following proportions:

21.775 parts by weight amalgam.
28.225 parts by weight catalytic alloy.
50.0 parts by weight extender metal.

The weighting and blending of the foregoing metallic compounds should be done in an inert atmosphere.

After blending to provide a uniform mixture the resultant mixture is compressed to form a solid mas by application of pressure of about 40,000 pounds per square inch in a graphite mold conforming to the desired shape of the finished product. The compressed mass is disposed in a crucible conforming to its shape and is heated to an elevated temperature of about 10° C. above the melting point of the mass and this temperature is maintained for about 10±1 minutes. In the oven utilized for heating, an inert atmosphere is maintained. Thereafter crucible and its contents are transferred to a dessicator wherein an inert atmosphere is maintained. Upon cooling, the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

Each reactor block having the extender material identified in Table a is contacted with a fine spray of water at about room temperature in an atmospheric environment. The gaseous effluent from the contact comprising hydrogen and oxygen and burns when subjected to electrical sparking. The volume of gas is dependent upon reactor block surface area and the volume of the water impinging thereon.

As set forth in Table A, the first column sets forth the extender metal, the second column sets forth the dissociation reaction temperature in degrees C., the third column sets forth the dissociation reaction temperature in degrees F and the fourth column generally sets forth the quantity of water per minute that will react with a 2.5 square cm surface of the reactor block.

TABLE A

| | °C. | °F. | Gal/Min. |
| --- | --- | --- | --- |
| Silver | 209.3 | 408.7 | 0.151 |
| Copper | 223.9 | 435.0 | 0.161 |
| Thallium | 226.5 | 439.7 | 0.163 |
| Titanium | 356.7 | 674.1 | 0.257 |
| Magnesium | 364.4 | 687.9 | 0.262 |
| Molybdenum | 371.3 | 700.3 | 0.267 |
| Tungsten | 381.6 | 718.9 | 0.275 |
| Cadmium | 404.2 | 759.6 | 0.291 |
| Nickel | 404.2 | 759.6 | 0.291 |

TABLE A-continued

| | °C. | °F. | Gal/Min. |
| --- | --- | --- | --- |
| Rhodium | 406.6 | 763.8 | 0.293 |
| Iron | 414.2 | 775.5 | 0.298 |
| Palladium | 416.7 | 782.1 | 0.300 |
| Cobalt | 417.9 | 784.2 | 0.300 |
| Chromium | 419.2 | 786.6 | 0.302 |
| Tin | 419.2 | 786.6 | 0.302 |
| Iridium | 424.2 | 795.6 | 0.305 |
| Lead | 438.5 | 821.3 | 0.316 |
| Gallium | 439.2 | 822.6 | 0.316 |
| Vanadium | 440.7 | 825.3 | 0.317 |
| Gold | 440.7 | 825.3 | 0.317 |
| Antimony | 447.9 | 838.2 | 0.322 |
| Zirconium | 449.2 | 840.6 | 0.323 |

Although the invention has been described in detail with respect to specific examples, it will be appreciated that various changes and modifications can be made by those skilled in the art within the scope of the invention as expressed in the following claims.

The invention having been described, what is claimed is:

1. A material for the generation of hydrogen and oxygen from water at controlled rates, comprising: an amalgam of an alkali metal, mercury and aluminum wherein the atomic weight ratio of alkali metal to mercury is from about 3:1 to about 1:1.5 and the atomic weight ratio of alkali metal to aluminum is from about 1:1 to about 3:1; a catalytic alloy of platinum and at least one element selected from the group consisting of germanium, antimony, gallium, thallium, indium, cadmium, bismuth, lead, zinc and tin; and an extender metal comprising at least one metal selected from the group consisting of silver, copper, thallium, titanium, magnesium, molybdenum, tungsten, cadmium, nickel, rhodium, iron, palladium, cobalt, chromium, tin, iridium, lead, gallium, vanadium, gold, antimony, zirconium and bismuth, said extender metal comprising from about 0.1 wt. % to about 97.3 wt. % of the total combination of amalgam, catalytic alloy and extender metal.

2. The material of claim 1, further characterized in that the material is from about 0.1 wt. % to about 66.7 wt. % extender metal.

3. The material of claim 1, further characterized in that the extender comprises copper.

4. The material of claim 3, further characterized in that the material is from about 0.1 wt. % to about 66.7 wt % extender metal.

5. The material of claim 1, further characterized in that the alkali metal is sodium or potassium.

6. The material of claim 1, further characterized in that the catalytic alloy comprises platinum and at least one metal selected from the group consisting of germanium, antimony, gallium, thallium, indium and cadmium and the alkali metal of the amalgam is sodium.

7. The material of claim 6, further characterized in that the catalytic alloy comprises platinum and antimony.

8. The material of claim 6, further characterized in that the catalytic alloy comprises platinum and germanium.

9. The material of claim 6, further characterized in that the catalytic alloy also contains a metal selected from the group consisting of zirconium, chromium and mixtures thereof.

10. The material of claim 6, further characterized in that the catalytic alloy also contains a metal selected from the group consisting of lead, gold and mixtures thereof.

11. The material of claim 6, further characterized in that the ratio, by weight, of catalytic alloy to amalgam is from about 1:1 to about 1:5.

12. The material of claim 11, further characterized in that the ratio, by weight, of catalytic alloy to amalgam is about 1:1 to about 1:3.

13. The material of claim 9, further characterized in that the catalytic alloy contains from about 0.7% to about 1.1% by weight chromium.

14. The material of claim 6, further characterized in that the each of the metallic components of the catalytic alloy present in said material is present in an amount of from about 0.4 to about 28.5 weight percent based upon the weight of catalytic alloy and amalgam combined.

15. A process for the generation of hydrogen and oxygen from water at controlled rates, comprising the steps of: contacting water with an alloy of an amalgam of an alkali metal, mercury and aluminum wherin the atomic weight ratio of alkali metal to mercury is from about 3:1 to about 1:1.5 and the atomic weight ratio of alkali metal to aluminum is from about 1:1 to about 3:1, a platinum contaning catalytic alloy, and said extender metal comprising at least one metal selected from the group consisting of silver, copper, thallium, titanium, magnesium, molbydenum, tungsten, cadmium, nickel, rhodium, iron, palladium, cobalt, chromium, tin, iridium, lead, gallium, vanadium, gold, antimony, zironcium and bismuth, said extender metal comprising from about 0.1 wt. % to about 97.3 wt. % of the total combination of amalgam catalytic alloy and extender metal.

16. The process of claim 15, further characterized in that the material is from about 0.1 wt. % to about 66.7 wt. % extender metal.

17. The process of claim 15, further characterized in that the extender comprises copper.

18. The process of claim 17, further characterized in that the material is from about 0.1 wt. % to about 66.7 wt. % extender metal.

19. The process of claim 15, further characterized in that the alkali metal is sodium, potassium or mixtures thereof.

20. The process of claim 19, further characterized in that the catalytic alloy comprises platinum and at least one metal selected from the group consisting of germanium, antimony, gallium, thallium, indium, cadmium, bismuth, lead, zinc and tin.

21. The process of claim 15, further characterized in that the catalytic alloy comprises platinum and at last one metal selected from the group consisting of germanium, antimony, gallium, thallium, indium, and cadmium and the alkali metal of the amalgam is sodium.

22. The process of claim 21, further characterized in that the catalytic alloy comprises platinum and antimony.

23. The process of claim 21, further characterized in that the catalytic alloy comprises platinum and germanium.

24. The process of claim 21, further characterized in that the catalytic alloy also contains a metal selected from the group consisting of zirconium, chromium and mixtures thereof.

25. The process of claim 21, further characterized in that the catalytic alloy also contains a metal selected from the group consisting of lead, gold and mixtures thereof.

26. The process of claim 21, further characterized in that the ratio, by weight, of alloy to amalgam is from about 1:1 to about 1:5.

27. The process of claim 26, further characterized in that the ratio, by weight, of catalytic alloy to amalgam is about 1:1 to about 1:3.

28. The process of claim 24, further characterized in that the catalytic alloy contains from about 0.7% to about 1.1% by weight chromium.

29. The process of claim 15, further characterized in that each of the metallic components of the catalytic alloy present in said material is present in an amount of from about 0.4 to about 28.5 weight percent based upn the weight of alloy and amalgam combined.

* * * * *